US009500149B2

United States Patent
Son et al.

(10) Patent No.: US 9,500,149 B2
(45) Date of Patent: Nov. 22, 2016

(54) APPARATUS AND METHOD FOR ESTIMATING ENGINE POWER

(71) Applicant: HYUNDAI AUTRON CO., LTD., Seongnam-si (KR)

(72) Inventors: Se-Hoon Son, Seongnam-si (KR); Chang-Kyu Shin, Seongnam-si (KR); Kwang-Hyuk Lim, Seongnam-si (KR); Jong-Ik Choi, Gyeonggi-do (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 171 days.

(21) Appl. No.: 14/564,734

(22) Filed: Dec. 9, 2014

(65) Prior Publication Data

US 2016/0102621 A1 Apr. 14, 2016

(51) Int. Cl.
*G06F 7/00* (2006.01)
*G06F 17/00* (2006.01)
*G06F 19/00* (2011.01)
*F02D 41/02* (2006.01)
*F16H 63/50* (2006.01)
*F02D 41/04* (2006.01)

(52) U.S. Cl.
CPC ............ *F02D 41/023* (2013.01); *F02D 41/045* (2013.01); *F16H 63/502* (2013.01); *F02D 2200/1004* (2013.01); *F02D 2200/501* (2013.01); *F02D 2200/602* (2013.01)

(58) Field of Classification Search
USPC ......... 477/5, 3; 180/65.21, 65.275; 903/930, 903/945; 701/54, 64, 99, 59; 74/731.1, 74/733.1
See application file for complete search history.

(56) References Cited

U.S. PATENT DOCUMENTS 5,309,790 A * 5/1994 Tanaka ................ F16H 61/0437
477/161
5,989,155 A 11/1999 Wadas et al.
6,014,604 A * 1/2000 Kuroiwa ............... B60W 10/06
477/115

(Continued)

FOREIGN PATENT DOCUMENTS

DE 60 2004 012 860 T2 5/2009
JP 61096247 A * 5/1986 ............... F16H 5/64

(Continued)

OTHER PUBLICATIONS

Time-frequency signal analysis of the acoustic emission of Formula 1 engines; P. Azzoni; D. Moro; G. Rizzoni Time-Frequency and Time-Scale Analysis, 1998. Proceedings of the IEEE-SP International Symposium on Year: 1998; pp. 441-444, DOI: 10.1109/TFSA.1998.721456.*

(Continued)

*Primary Examiner* — Cuong H Nguyen
(74) *Attorney, Agent, or Firm* — Morgan, Lewis & Bockius LLP (57) ABSTRACT

Provided is an engine power estimation apparatus for estimating an engine power at a gear shift completion time when making a speed change of a vehicle. The engine power estimation apparatus includes a gear shift detection unit configured to detect the speed change of the vehicle; an axle speed estimation unit configured to calculate a target axle speed at the gear shift completion time, using an axle speed and a gear shift time learning value, when the speed change of the vehicle is detected; and an engine power estimation unit configured to calculate a target engine power at the gear shift completion time, using the target axle speed and engine load information.

12 Claims, 5 Drawing Sheets

(56) References Cited

U.S. PATENT DOCUMENTS

| | | | |
|---|---|---|---|
| 7,578,766 B2* | 8/2009 | Watanabe | F16H 61/0213 477/107 |
| 7,771,310 B2* | 8/2010 | Tanishima | B60K 6/387 180/65.21 |
| 7,892,143 B2* | 2/2011 | Kato | B60W 10/02 477/107 |
| 8,265,840 B2* | 9/2012 | Watanabe | F16H 61/08 477/109 |
| 2008/0058159 A1* | 3/2008 | Watanabe | F16H 61/0213 477/156 |
| 2008/0248924 A1* | 10/2008 | Kato | B60W 10/02 477/124 |
| 2009/0248261 A1* | 10/2009 | Kuwahara | F02D 41/023 701/54 |
| 2009/0271081 A1* | 10/2009 | Watanabe | F16H 61/08 701/60 |
| 2011/0125375 A1* | 5/2011 | Tokura | F16H 61/0437 701/51 |
| 2013/0304337 A1* | 11/2013 | Terakawa | F02D 29/02 701/58 |
| 2015/0119190 A1* | 4/2015 | Isomura | B60W 20/20 477/3 |

FOREIGN PATENT DOCUMENTS

| | | | |
|---|---|---|---|
| JP | 5-60212 A | 3/1993 | |
| JP | 2005-16439 A | 1/2005 | |
| JP | 02005195170 A * | 7/2005 | ............ F16D 25/12 |
| JP | 2009047174 A * | 3/2009 | ............ F02D 29/00 |
| JP | 2009-85291 A | 4/2009 | |
| JP | 2013056618 A * | 3/2013 | ......... Y02T 10/6221 |
| JP | 2013-96515 A | 5/2013 | |
| KR | 10-0250311 B1 | 4/2000 | |
| WO | WO 2012124493 A1 * | 9/2012 | ............... B60K 6/48 |

OTHER PUBLICATIONS

Fuel Consumption Estimates Based on Driving Pattern Recognition; from ieeexplore.ieee.org/xpls/abs_all.jsp?; Institute of Electrical and Electronics Engineers; by Xiaohua Zhou et al., School of Computer Science & Engineerng, Beihang Unversity,Bejing, China—2013 IEEE and Internet of Things, p. 496-503, Aug. 20-23, 2013.; IEEE Inter. Conf.*

Fuel economy optimization of hybrid electric vehicles; Chao Li; Qifang Liu; Lulu Guo; Hong Chen; The 27th Chinese Control and Decision Conference (2015 CCDC); Year: 2015; pp. 810-815, DOI: 10.1109/CCDC.2015.7162030.*

Instrument for Compensating hole of Brake Cylinder Measurement ; Li Zhenhui; Wang hongzhi; Xiang yang; Electronic Measurement and Instruments, 2007. ICEMI '07. 8th International Conference on; Year: 2007; pp. 1-635-1-638, DOI: 10.1109/ICEMI.2007. 4350530.*

* cited by examiner

| Measurement count | First stage → Second stage | Second stage → Third stage | Third stage → Fourth stage | ... | Second stage → First stage |
|---|---|---|---|---|---|
| 1 time | 1.05 | 0.9 | 0.9 | ... | 0.9 |
| 2 time | 1.1 | 0.85 | 0.8 | ... | 0.8 |
| 3 time | 0.9 | 0.95 | 0.85 | ... | 0.8 |
| ⋮ | | | | | |
| 10 time | 1.0 | 0.9 | 0.85 | ... | 0.85 |
| Average | 1.1 | 0.9 | 0.8 | ... | 0.8 |

FIG. 3

| Item | Value | Unit |
|---|---|---|
| Vehicle speed | 50 | km/h |
| Engine torque | 140 | Nm |
| T/C multiplication ratio | 0.98 | - |
| Turbine torque | 137.2 | Nm |
| Speed increase | 100 | rpm/s |
| Axle speed (Gear shift occurrence) | 1598 | rpm |
| Gear shift time learning value | 1.6 | sec |
| Axle speed (Gear shift completion) | 1758 | rpm |

FIG. 4

| Gear | Gear ratio | Turbine speed (current value) | Engine speed (current value) | Engine power (current value) | Turbine speed (target value) | Engine speed (target value) | Engine power (target value) |
|---|---|---|---|---|---|---|---|
| 1 | 3.5 | 5593 | 5707 | 83 | 6153 | 6278 | 92 |
| 2 | 2.3 | 3675 | 3750 | 54 | 4043 | 4125 | 60 |
| 3 | 1.5 | 2397 | 2445 | 35 | 2637 | 2690 | 39 |
| 4 | 1.2 | 1917 | 1956 | 28 | 2109 | 2152 | 31 |
| 5 | 1 | 1598 | 1630 | 23 | 1758 | 1793 | 26 |
| 6 | 0.8 | 1278 | 1304 | 19 | 1406 | 1435 | 21 |
| 7 | 0.6 | 958 | 978 | 14 | 1054 | 1076 | 15 |
| 8 | 3.5 | 5593 | 5707 | 83 | 6153 | 6278 | 92 |

APPARATUS AND METHOD FOR ESTIMATING ENGINE POWER

CROSS-REFERENCE TO RELATED APPLICATION

This application claims priority to Korean Patent Application No. 10-2014-0138372 filed on 14 Oct., 2014, and all the benefits accruing therefrom under 35 U.S.C. §119, the contents of which is incorporated by reference in its entirety.

BACKGROUND

1. Technical Field

The present disclosure relates to an apparatus and a method for estimating an engine power, and more particularly, to an apparatus for estimating an engine power at a gear shift completion time when making a gear shift of a vehicle.

2. Related Art

During operation of a vehicle, a driver operates an accelerator pedal or brake pedal to change the speed of the vehicle. The driver's intention to accelerate or decelerate the vehicle appears as a power change of an engine, and an engine torque and engine speed which determine engine power serve as influence factors for determining a gear of a transmission, in order to change the speed of the vehicle to a speed requested by the driver.

In an engine torque map, an engine power may be determined according to a throttle valve opening degree, an engine speed, and an engine torque. In a shifting map, a gear stage may be determined by reflecting a vehicle state (for example, a vehicle speed or current gear stage) based on the engine power. In the case of the shifting map and the engine output determined according to a standardized pattern, an unnecessary change of the gear shift stage, such as busy shifting, may occur depending on a situation or a power train may be inefficiently controlled to degrade fuel efficiency.

SUMMARY

Various embodiments are directed to an engine output estimation apparatus which is capable of calculating a target axle speed using an axle speed and a gear shift time learning value during a speed change of a vehicle, and calculating a target engine power at a gear shift completion time by considering the calculated target axle speed and engine load information, thereby estimating an engine power at the gear shift completion time, which is requested by a driver, with more precision.

Also, various embodiments are directed to an engine power estimation apparatus which is capable of controlling an engine according to a target engine power which is predicted to be requested by a driver at a gear shift completion time, or particularly shifting a gear to a gear shift stage corresponding to the target engine power, and thus preventing an unnecessary shift of a transmission, thereby reducing a gear shift shock and improving gear shift performance of a vehicle.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In an embodiment, an engine power estimation apparatus may include: a gear shift detection unit configured to detect the speed change of the vehicle; an axle speed estimation unit configured to calculate a target axle speed at the gear shift completion time, using an axle speed and a gear shift time learning value, when the speed change of the vehicle is detected; and an engine power estimation unit configured to calculate a target engine power at the gear shift completion time, using the target axle speed and engine load information.

In an embodiment, an engine power estimation method may include: detecting the speed change of the vehicle; calculating a target axle speed at the gear shift completion time, using an axle speed and a gear shift time learning value, when the speed change of the vehicle is detected; and calculating a target engine power at the gear shift completion time, using the target axle speed and engine load information.

DETAILED DESCRIPTION

Exemplary embodiments will be described below in more detail with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Moreover, detailed descriptions related to well-known functions or configurations will be ruled out in order not to unnecessarily obscure subject matters of the present invention. Throughout the disclosure, like reference numerals refer to like parts throughout the various figures and embodiments of the disclosure.

Figure 1:
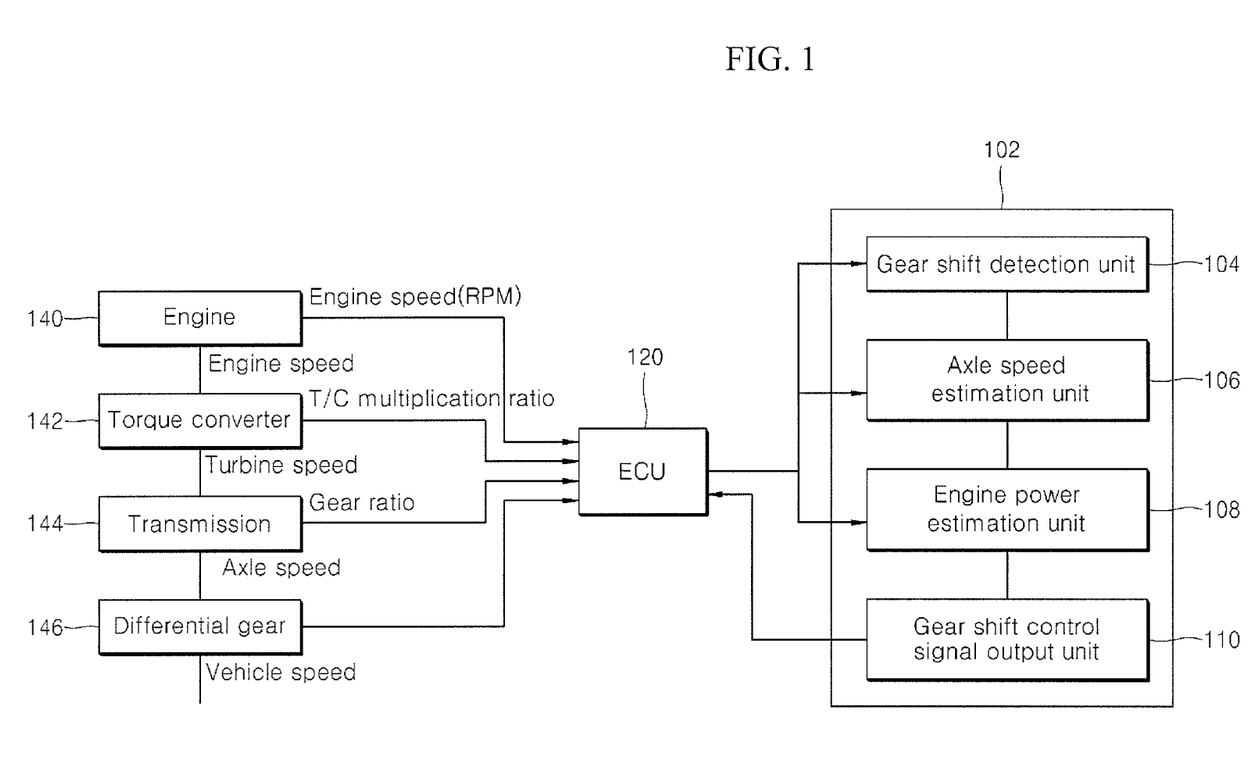
FIG. 1 is a configuration diagram of an engine power estimation apparatus according to an embodiment of the present invention.

FIG. 1 is a configuration diagram of an engine power estimation apparatus according to an embodiment of the present invention. Referring to FIG. 1, the engine power estimation apparatus 102 according to the embodiment of the present invention may include a gear shift detection unit 104, an axle speed estimation unit 106, an engine power estimation unit 108, and a gear shift control signal output unit 110. The engine power estimation apparatus 102 may be connected to an electronic control unit 120 of a vehicle. Furthermore, the engine power estimation apparatus 102 may be implemented as a separate unit as illustrated in FIG. 1 or integrated with the electronic control unit 120, depending on an embodiment.

In FIG. 1, the electronic control unit 120 may acquire engine load information, for example, an axle speed, a vehicle speed, an engine speed (RPM), a torque converter multiplication ratio, and a gear ratio from an engine 140, a torque converter 142, a transmission 144, and a differential gear 146. The electronic control unit 120 may acquire operation information such as a displacement value of an accelerator pedal or brake pedal or a throttle valve opening degree.

The engine power estimation apparatus 102 may receive the engine load information and the information for vehicle operation, which are acquired by the electronic control unit 120. According to various embodiments of the present invention, the engine power estimation apparatus 102 may be integrated with the electronic control unit 120, or configured to directly receive the engine load information and the information for vehicle operation.

The gear shift detection unit 104 may detect a speed change of the vehicle. More specifically, the gear shift detection unit 104 may not only detect a gear shift operation of the driver, but also detect whether the speed of the vehicle was actually changed according to the gear shift operation of the driver.

Desirably, the gear shift detection unit 104 may detect a gear shift operation of the driver in consideration of one or more of an accelerator pedal displacement value, a brake pedal displacement value, and a throttle valve opening degree. Although the gear shift detection unit 104 detects an accelerator pedal operation of the driver through the accelerator pedal displacement value, the vehicle may be operated at a constant speed depending on an operation environment such as a gradient of the road.

Although the gear shift operation of the driver is detected, the gear shift detection unit 104 may detect whether the speed of the vehicle was changed according to the gear shift operation of the driver, in consideration of the speed of the vehicle.

The axle speed estimation unit 106 may calculate a target axle speed at a gear shift completion time, using an axle speed and a gear shift time learning value, when the speed change of the vehicle is detected.

The gear shift may indicate that a stage of a multi-stage transmission is changed, and the gear shift completion time may indicate the time at which the change in stage of the multi-stage transmission is completed when the stage of the multi-stage transmission is changed, in consideration of a current axle speed and a change rate of the axle speed. For example, when the stage of the transmission is changed from a second stage to a third stage, the time at which the stage change to the third stage is completed may indicate a gear shift completion time.

The axle speed estimation unit 106 may calculate a target axle speed at the gear shift completion time, using the axle speed and the gear shift time learning value. Desirably, the axle speed estimation unit 106 may apply a previously measured gear shift time learning value to a change rate (longitudinal acceleration) of the axle speed, and calculate an estimated change of the axle speed up to the gear shift completion time. Then, the axle speed estimation unit 106 may add the estimated change of the axle speed and a current value of the axle speed, and calculate the target axle speed at the gear shift completion time.

More specifically, the axle speed estimation unit 106 may calculate the change rate of the axle speed by dividing a change of the axle speed for a predetermined time t by the predetermined time t. Furthermore, the axle speed estimation unit 106 may calculate the estimated change of the axle speed by multiplying the calculated axle speed change rate (rpm/sec) by the previously measured gear shift time learning value (sec).

The gear shift time learning value indicates a value obtained by measuring a time required for a stage change of the transmission when the stage of the transmission is changed. For example, when the transmission is changed from the first stage to the second stage, a time required for the stage change may be measured multiple times and recorded in a table. The time required for the stage change or an average thereof may be used as a gear shift time learning value.

Figure 2:
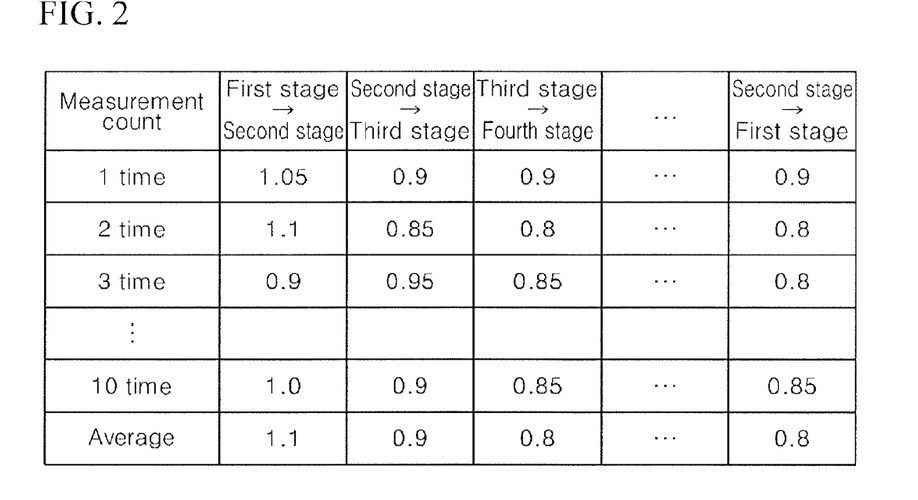
FIG. 2 is a gear shift time learning value table according to the embodiment of the present invention.

FIG. 2 is a gear shift time learning value table according to the embodiment of the present invention. The gear shift time learning value table of FIG. 2 may be formed by measuring a time required for a stage change whenever the transmission is shifted. In FIG. 2, a time required for each gear shift may be measured ten times, and an average of the times may be used as a gear shift time learning value.

As such, the axle speed estimation unit 106 may calculate the estimated change of the axle speed by multiplying the axle speed change rate and the gear shift time learning value, and calculate the target axle speed at the gear shift completion time by adding the estimated change of the axle speed and the current value of the axle speed.

The above-described target axle speed calculation process may be expressed as Equation 1 below.

$$\text{Target axle speed} = \text{current axle speed} + \text{axle speed change rate(longitudinal acceleration)} * \text{gear shift time learning value} \quad [\text{Equation 1}]$$

The engine power estimation unit 108 may calculate a target engine power at the gear shift completion time, using the target axle speed and engine load information. The engine load information may include a gear ratio of the transmission, a torque converter multiplication ratio of the torque converter, and an engine torque of the engine.

Desirably, the engine power estimation unit 108 may calculate the target engine power through the following calculation process.

1. First Calculation Process

The engine power estimation unit 108 may calculate a target turbine speed using the target axle speed and the gear ratio. More specifically, the engine power estimation unit 108 may calculate the target turbine speed by multiplying the target axle speed calculated by the axle speed estimation unit 106 by the gear ratio of the transmission. The first calculation process may be expressed as Equation 2 below.

$$\text{Target turbine speed} = \text{target axle speed} * \text{gear ratio} \quad [\text{Equation 2}]$$

2. Second Calculation Process

The engine power estimation unit 108 may calculate a target engine speed using the target turbine speed calculated at the first calculation process and the torque converter multiplication ratio of the torque converter. More specifically, the engine power estimation unit 108 may calculate the target engine speed by dividing the target turbine speed by the torque converter multiplication ratio. The second calculation process may be expressed as Equation 3 below.

$$\text{Target engine speed} = \text{target turbine speed} / \text{torque converter multiplication ratio} \quad [\text{Equation 3}]$$

3. Third Calculation Process

The engine power estimation unit 108 may calculate a target engine power using the target engine speed calculated at the second calculation process and the engine torque. More specifically, the engine power estimation unit 108 may calculate the target engine power by multiplying the target engine speed by the engine torque. The third calculation process may be expressed as Equation 4 below.

Target engine power=target engine speed*engine torque [Equation 4]

As such, the engine power estimation unit 108 may calculate the target engine power at the gear shift completion time.

According to the embodiment of the present invention, the engine power estimation apparatus may calculate a target axle speed using an axle speed and a gear shift time learning value during a speed change of the vehicle, and calculate a target engine power at a gear shift completion time in consideration of the calculated target axle speed and engine load information. Thus, the engine power estimation apparatus may estimate an engine power at the gear shift completion time, which is requested by a driver, with more precision.

The engine power estimation apparatus 102 according to the embodiment of the present invention may determine a proper gear shift stage according to the target engine power. For this operation, the engine power estimation apparatus 102 may further include a gear shift control signal output unit 110.

The gear shift control signal output unit 110 may determine a target gear shift stage according to the target engine power, and output a gear shift control signal for shifting the gear to the determined target gear shift stage. Desirably, the gear shift control signal output unit 110 may determine the target gear shift stage by considering one or more of a speed of the vehicle, an accelerator pedal displacement value, a brake pedal displacement value, and a throttle valve opening degree, based on the target engine power.

According to the embodiment of the present invention, the engine power estimation apparatus may control the engine according to a target engine power which is predicted to be requested by a driver at a gear shift completion time, or particularly shift the gear to a gear shift stage corresponding to the target engine power. Thus, the engine power estimation apparatus may prevent an unnecessary gear shift of the transmission, thereby reducing a gear shift shock and improving the gear shift performance of the vehicle.

Figure 3:
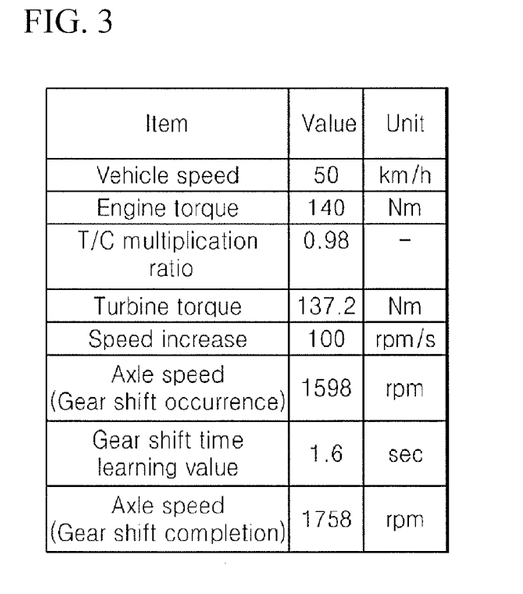
FIG. 3 is a table showing an example of an engine load condition when a speed change occurs during operation of a vehicle.
Figure 4:
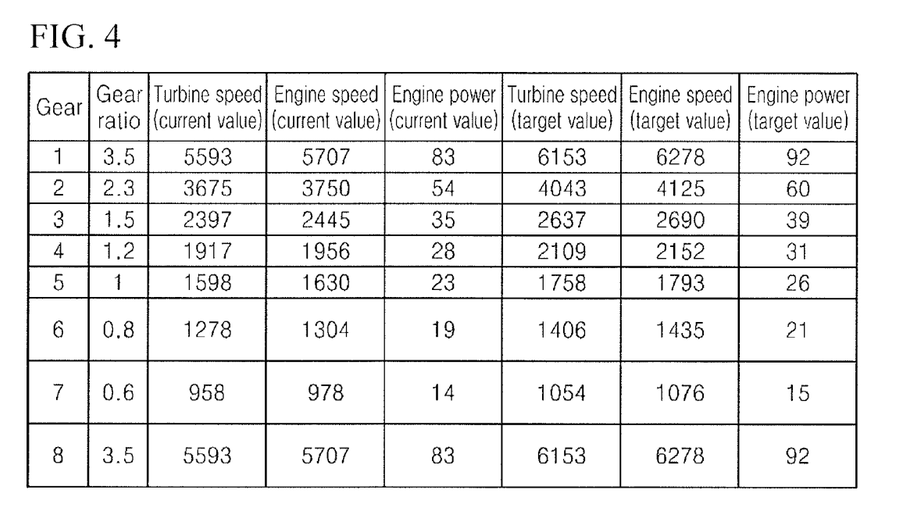
FIG. 4 is a table for explaining a process of calculating a target engine power based on the engine load condition of FIG. 3.

FIG. 3 is a table showing an example of an engine load condition when a speed change occurs during operation of a vehicle. FIG. 4 is a table for explaining a process of calculating a target engine power based on the engine load condition of FIG. 3.

In the example of FIG. 3, suppose that the vehicle is operated at 50 km/h and a gear shift is performed by a driver. Furthermore, suppose that an axle speed is set to 1,598 rpm, a change rate of the axle speed per unit time, that is, a representative longitudinal acceleration is set to 100 rpm/s, a gear shift time learning value is 1.6 sec, a representative engine torque is 140 Nm, and a torque converter multiplication ratio is set to 0.98.

First, when the current axle speed of 1,598 rpm is added to an estimated axle speed change of 160 rpm, obtained by multiplying the representative longitudinal acceleration of 100 rpm/sec by the shift time learning value of 1.6 sec, a target axle speed may be calculated as 1,758 rpm.

In this case, referring to FIG. 4, when the target axle speed of 1,758 rpm is multiplied by the gear ratio of 3.5, a target turbine speed may be calculated as 6,153. Furthermore, when the target turbine speed is divided by the torque converter multiplication ratio of 0.98, a target engine speed may be calculated as 6,278 rpm. Then, a target engine power may be calculated by multiplying the calculated target engine speed by the engine torque of 140 Nm.

At this time, a different engine load condition may be applied to each operation condition of the vehicle, for example, an operation condition in which fuel efficiency is emphasized or an operation condition in which performance is emphasized. FIG. 4 shows target engine powers calculated for various conditions.

Figure 5:
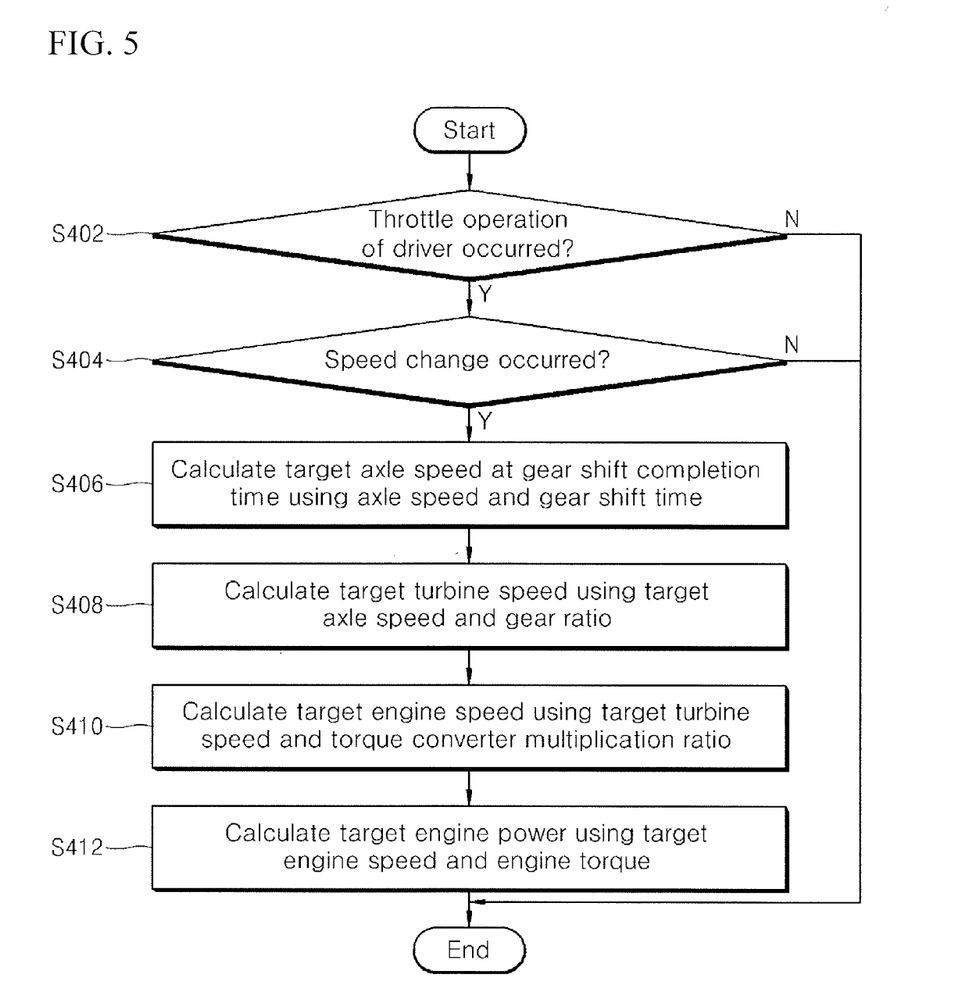
FIG. 5 is a flowchart illustrating an engine power estimation method according to an embodiment of the present invention.

FIG. 5 is a flowchart illustrating an engine power estimation method according to an embodiment of the present invention. Referring to FIG. 5, the gear shift detection unit may determine whether a driver operated the throttle valve at step S402, and determine whether a speed change occurred according to the throttle valve operation of the driver at step S404. At steps S402 and S404, the gear shift detection unit may detect a gear shift operation in consideration of one or more of an accelerator pedal displacement value, a brake pedal displacement value, and a throttle valve opening degree, and determine whether the speed of the vehicle was changed through the gear shift operation of the driver, in consideration of the speed of the vehicle.

Then, when the speed change of the vehicle is detected, the axle speed estimation unit may calculate a target axle speed at a gear shift completion time, using an axle speed and a gear shift time learning value, at step S406. More specifically, step S406 may include calculating an estimated change up to the gear shift completion time by applying a previously measured gear shift time learning value to a change rate of the axle speed, and calculating a target axle speed at the gear shift completion time by adding the estimated change of the axle speed and the current value of the axle speed.

Then, the target axle speed and engine load information may be used to calculate a target engine power at the gear shift completion time, through steps S408 to S412.

Specifically, the target axle speed calculated at step S406 and a gear ratio may be used to calculate a target turbine speed at step S408. Then, the target turbine speed and a torque converter multiplication ratio may be used to calculate a target engine torque at step S410. Finally, the target engine speed and an engine torque may be used to calculate a target engine power at step S412. Steps S406 to S412 may be performed through Equations 1 to 4 as described above.

According to the embodiment of the present invention, the engine power estimation method may calculate a target axle speed using an axle speed and a gear shift time learning value during a speed change of the vehicle, and calculate a target engine power at a gear shift completion time in consideration of the calculated target axle speed and engine load information. Thus, the engine power estimation method may estimate the engine power at the gear shift completion time, which is requested by a driver, with more precision.

The engine power estimation method according to the embodiment of the present invention may further include determining a target gear shift stage using the target engine power calculated through steps S402 to S412 of FIG. 5, and outputting a gear shift control signal for shifting the gear to the determined target gear shift stage.

Figure 6:
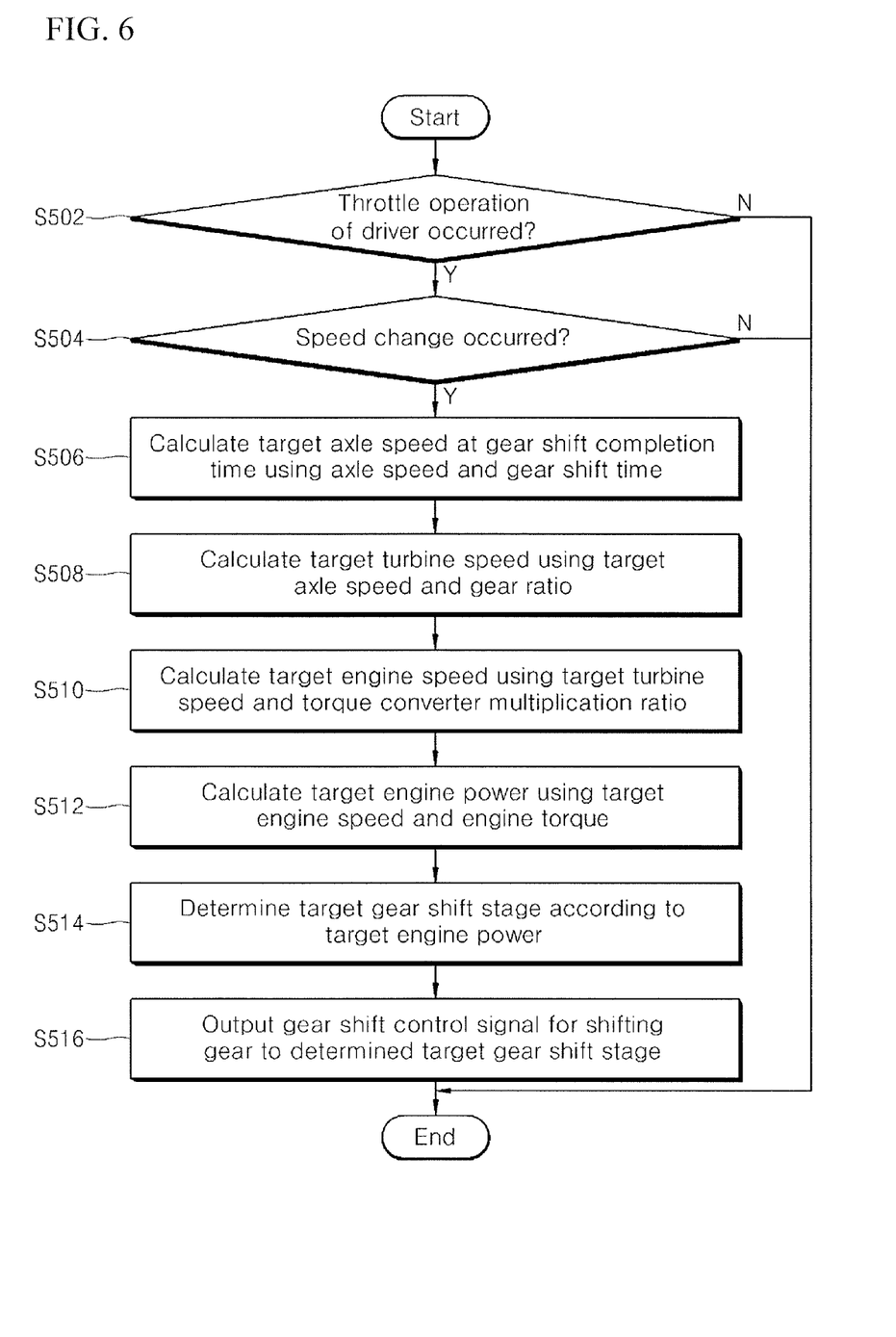
FIG. 6 is a flowchart illustrating an engine power estimation method according to an embodiment of the present invention.

FIG. 6 is a flowchart illustrating an engine power estimation method according to an embodiment of the present invention. In FIG. 6, steps S502 to S512 correspond to the respective steps of FIG. 5. FIG. 6 further includes steps S514 and S516 in addition to the steps of the engine power estimation method of FIG. 5.

More specifically, after step S512, the gear shift control signal output unit may determine a target gear shift stage according to the target engine power at step S514. More specifically, step S514 may include determining the target gear shift stage by considering one or more of a speed of the vehicle, an accelerator pedal displacement value, a brake pedal displacement value, and a throttle valve opening degree, based on the target engine power.

After step S514, the gear shift control signal output unit may output a gear shift control signal for shifting the gear to the determined target gear shift stage at step S516. The output signal may be transmitted to the electronic control unit or transmission so as to shift the gear of the transmission.

According to the embodiment of the present invention, the engine power estimation method may control the engine according to a target engine power which is predicted to be requested by a driver at a gear shift completion time, or particularly shift the gear to a gear shift stage corresponding to the target engine power. Thus, the engine power estimation method may prevent an unnecessary gear shift of the transmission, thereby reducing a gear shift shock and improving the gear shift performance of the vehicle.

While various embodiments have been described above, it will be understood to those skilled in the art that the embodiments described are by way of example only. Accordingly, the disclosure described herein should not be limited based on the described embodiments.

What is claimed is:

1. An engine power estimation apparatus for estimating an engine power at a gear shift completion time when making a speed change of a vehicle, comprising:
    a gear shift detection unit configured to detect the speed change of the vehicle;
    an axle speed estimation unit configured to calculate a target axle speed at the gear shift completion time, using an axle speed and a gear shift time learning value, when the speed change of the vehicle is detected; and
    an engine power estimation unit configured to calculate a target engine power at the gear shift completion time, using the target axle speed and engine load information.

2. The engine power estimation apparatus of claim 1, wherein the gear shift detection unit detects a gear shift operation of a driver by considering one or more of an accelerator pedal displacement value, a brake pedal displacement value, and a throttle valve opening degree, and detects whether the speed of the vehicle was changed according to the gear shift operation of the driver, by considering a speed of the vehicle.

3. The engine power estimation apparatus of claim 1, wherein the axle speed estimation unit calculates an estimated change of the axle speed up to the gear shift completion time by applying a previously measured gear shift time learning value to a change rate of the axle speed, and calculates a target axle speed at the gear shift completion time by adding the estimated change rate of the axle speed and a current value of the axle speed.

4. The engine power estimation apparatus of claim 1, wherein the engine power estimation unit comprises:
    a first calculation process of calculating a target turbine speed using the target axle speed and a gear ratio;
    a second calculation process of calculating a target engine speed using the target turbine speed and a torque convert multiplication ratio; and
    a third calculation process of calculating a target engine power using the target engine speed and an engine torque.

5. The engine power estimation apparatus of claim 1, further comprising a gear shift control signal output unit configured to determine a target gear shift stage according to the target engine power, and output a gear shift control signal for shifting a gear to the determined target gear shift stage.

6. The engine power estimation apparatus of claim 5, wherein the gear control signal output unit determines the target gear shift stage by considering one or more of a speed of the vehicle, an accelerator pedal displacement value, a brake pedal displacement value, and a throttle valve opening degree, based on the target engine power.

7. An engine power estimation method for estimating an engine power at a gear shift completion time during a speed change of a vehicle, comprising:
    detecting the speed change of the vehicle;
    calculating a target axle speed at the gear shift completion time, using an axle speed and a gear shift time learning value, when the speed change of the vehicle is detected; and
    calculating a target engine power at the gear shift completion time, using the target axle speed and engine load information.

8. The engine power estimation method of claim 7, wherein the detecting of the speed change of the vehicle comprises:
    detecting a gear shift operation of a driver by considering one or more of an accelerator pedal displacement value, a brake pedal displacement value, and a throttle valve opening degree; and
    detecting whether the speed of the vehicle was changed according to the gear shift operation of the driver, by considering a speed of the vehicle.

9. The engine power estimation method of claim 7, wherein the calculating of the target axle speed at the gear shift completion time comprises:
    calculating an estimated change of the axle speed up to the gear shift completion time by applying a previously measured gear shift time learning value to a change rate of the axle speed; and
    calculating a target axle speed at the gear shift completion time by adding the estimated change of the axle speed and a current value of the axle speed.

10. The engine power estimation method of claim 7, wherein the calculating of the target engine power at the gear shift completion time comprises:
    calculating a target turbine speed using the target axle speed and a gear ratio;
    calculating a target engine speed using the target turbine speed and a torque converter multiplication ratio; and
    calculating a target engine power using the target engine speed and an engine torque.

11. The engine power estimation method of claim 7, further comprising:
    determining a target gear shift stage according to the target engine power; and
    outputting a gear shift control signal for shifting a gear to the determined target gear shift stage.

12. The engine power estimation method of claim 11, wherein the determining of the target gear shift stage according to the target engine power comprises determining the target gear shift stage by considering one or more of a speed of the vehicle, an accelerator pedal displacement value, a brake pedal displacement value, and a throttle, valve opening value, based on the target engine power.

* * * * *